Figure 1:
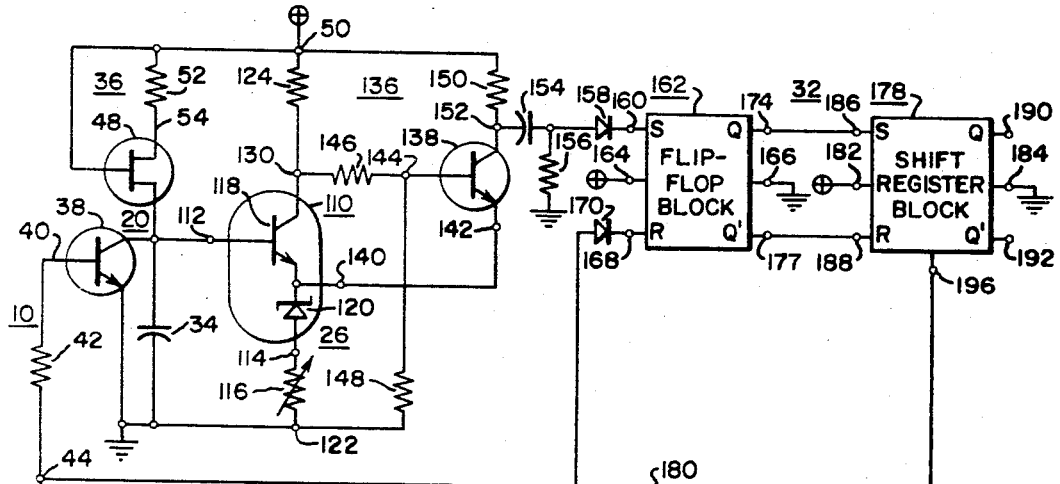

Aug. 20, 1968  O. L. APFELBECK  3,398,366
HIGHLY ACCURATE FREQUENCY MEASURING CIRCUIT
Filed Jan. 29, 1965  2 Sheets-Sheet 1

| LOGICAL BEHAVIOR OF 162 & 178 | | | | | | | | |
|---|---|---|---|---|---|---|---|---|
| 162 | | | | | 178 | | | |
| INPUT | | OUTPUT (Q) | | | INPUT | | OUTPUT (Q) | |
| R | S | INITIAL STATE | NEW STATE | | R | S | INITIAL STATE | NEW STATE* |
| ∅ | 0 | 0 | 0 | | 1 | ∅ | 0 | 0 |
| 0 | 1 | 0 | 1 | | 0 | 1 | 0 | 1 |
| 1 | 0 | 1 | 0 | | 1 | 0 | 1 | 0 |
| 0 | ∅ | 1 | 1 | | ∅ | 1 | 1 | 1 |

"1" – POSITIVE VOLTAGE
∅ – EITHER "0" OR "1"

*FOLLOWING PULSE AT 196

WITNESSES:
Bernard R. Greguez
Edward F. Possessky

INVENTOR
Otto L. Apfelbeck
BY
ATTORNEY

United States Patent Office 3,398,366
Patented Aug. 20, 1968

3,398,366
HIGHLY ACCURATE FREQUENCY
MEASURING CIRCUIT
Otto L. Apfelbeck, Lima, Ohio, assignor to Westinghouse
Electric Corporation, Pittsburgh, Pa., a corporation of
Pennsylvania
Filed Jan. 29, 1965, Ser. No. 428,910
6 Claims. (Cl. 324—78)

The present invention relates to frequency measuring circuits, and more particularly to such circuits which provide highly accurate frequency indications over relatively wide operating temperature ranges.

There is a wide variety of applications in which frequency measurement is needed for feedback control or other purposes. As one example, the AC power generating system of an air or space vehicle requires frequency regulation primarily to protect equipment against operation at off-design power frequencies. Such regulation is normally required at least to prevent the power frequency from dropping below a predetermined value, 380 cycles per second for example if the design frequency is 400 cycles per second. Frequency excursions above a predetermined value, 420 cycles per second for example, can normally be tolerated but if desired the power frequency can be regulated below an upper frequency boundary value.

At any rate, frequency measurement or sensing accuracy has a direct effect on the quality of frequency regulation since frequency measurement error can result in regulated system operation outside the desired operating frequency limits. In other applications, it is similarly true that frequency measurement error can lead to undesired variance in the end function served by the frequency measurement.

Frequency measurement accuracy is directly dependent on electrical operating characteristics of the sensing circuit and indirectly dependent on other variables of which a significant one is operating temperature. Where highly accurate frequency measurement is desired, it is therefore necessary that the frequency measuring circuit is basically arranged for measurement accuracy and further that it be arranged substantially to prevent frequency measurement error which could otherwise result from the effects of operating temperature variation on the electrical operating characteristics of individual circuit portions or elements.

In accordance with the principles of the present invention, a highly accurate frequency measurement circuit comprises a ramp voltage generator and pulse forming circuit means which resets the ramp generator at a predetermined point in each cycle of the input signal under measurement. A reference circuit provides a predetermined reference voltage level to which the ramp voltage is compared. If the ramp voltage exceeds the reference voltage level at ramp reset time, an off-frequency status is indicated for the input signal, and logic circuitry is preferably empoyed in response to the difference voltage at the ramp reset pulse so as to produce a continuous output indicating the frequency status of the input signal. At least one cycle response is thus provided since the signal frequency is sensed at least once each cycle. Solid state circuitry or components are employed in the frequency measuring circuit in a manner which generally provides high operating accuracy and which further substantially negates temperature induced error in the ramp voltage function and in the reference voltage level and in other circuit operating characteristics.

It is therefore an object of the invention to provide a novel frequency measuring circuit which operates with a high degree of accuracy.

Another object of the invention is to provide a novel frequency measuring circuit which operates with relatively fast response.

An additional object of the invention is to provide a novel frequency measuring circuit which includes solid state circuitry to provide highly accurate frequency indication along with advantages in packaging and reliability.

A further object of the invention is to provide a novel frequency measuring circuit which provides highly accurate frequency indications irrespective of wide circuit operating temperature variations.

It is another object of the invention to provide a novel frequency measuring circuit in which a ramp voltage and a reference voltage level are empoyed as principal parameters in the frequency measuring process of the circuit and in which such parameters are substantially independent of wide operating temperature variations to provide a high degree of overall circuit operating accuracy.

Figure 3:
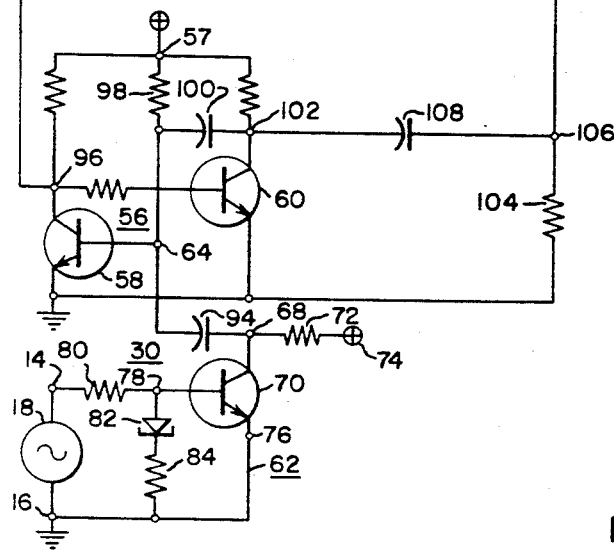
Figure 2:
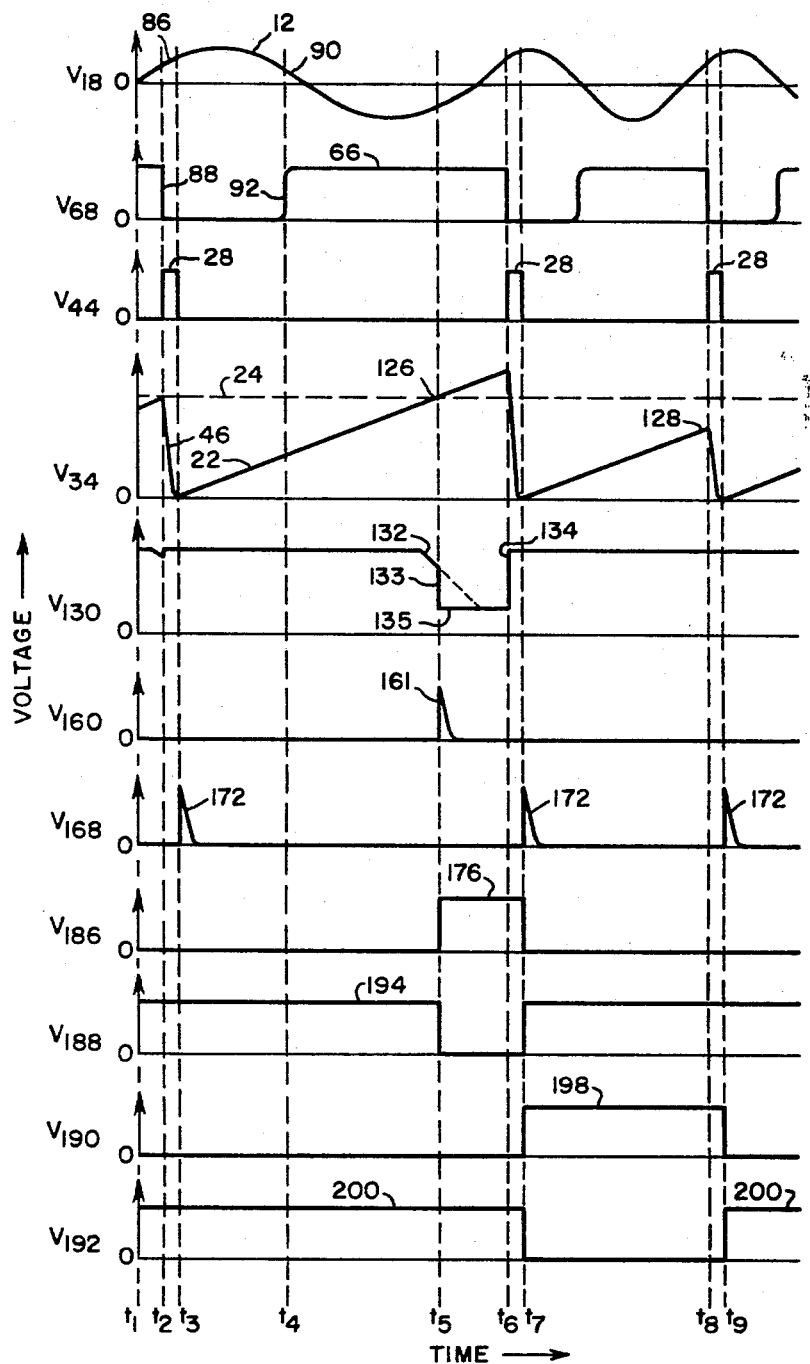

These and other objects of the invention will become more apparent upon consideration of the following detailed description along with the attached drawings, in which:

FIGURE 1 schematically shows a frequency measuring circuit arranged in accordance with the principles of the invention;

FIG. 2 shows a graph representing significant voltage waveforms in the circuit of FIG. 1 under different signal input conditions; and FIG. 3 shows a chart in which there is indicated the logic behavior of logic output circuitry included in the frequency measuring circuit of FIG. 1.

More specifically, there is shown in FIG. 1 a circuit 10 arranged to measure the frequency of an input signal 12 (FIG. 2) applied to input terminals 14 and 16 from source 18 in accordance with the principles of the invention. The signal 12 is cyclical in nature, in this instance sinusoidal, so as to be susceptible to frequency measurement.

The frequency measuring process employed by the circuit 10 centers about the measurement of time between successive identical waveform points in the time cycle of the signal 12. For this purpose, a voltage generator 20 produces a ramp voltage 22 (FIG. 2) for comparison to a reference voltage level 24 (FIG. 2) in a reference circuit 26. The ramp voltage 22 is initiated at identical phase points in each positive half cycle of the signal 12 by means of successive reset pulses 28 from pulse generating circuit 30 which operates in response to the input signal 12.

Logic output circuitry 32 is responsive to the reference circuit 26 to provide a continuous output indicating whether the ramp voltage reaches the reference voltage level in the time period between ramp reset pulses, and accordingly whether the signal 12 has a frequency less than the desired frequency corresponding to the preset reference voltage level 24. Although the voltage output of the reference circuit 26 is itself indicative of the status of the signal frequency, the logic circuitry 32 is preferably included in the frequency measuring circuit 10 to achieve a continuous output indication and further to provide the continuous output in digital form.

Ramp voltage is generated across output capacitor 34 by means of a constant current source 36 in the ramp generator 20. To obtain reset of the ramp voltage, the capacitor 34 is connected to ground through solid state switching means or a transistor 38 having base terminal 40 connected through a base current limiting resistor 42 to ramp reset pulse terminal 44. When a positive pulse 28 is conducted to the reset terminal 44, the transistor 38 is forward biased to discharge the capacitor 34 in a relatively short period of time as indicated by the reference character 46.

To assure substantially constant ramp current generation and hence substantially constant slope for the ramp voltage across the capacitor 34 irrespective of wide variation in operating temperature, the constant current generator 20 preferably includes a field effect transistor 48 connected between DC power supply terminal 50 and the capacitor 34. Drain current output of the field effect transistor 48 is made substantially constant with zero temperature drift by appropriate selection of resistor 52 which is connected between transistor source terminal 54 and the power supply terminal 50. The resistor 52 is selected to provide that value of drain current for which the drain current negative temperature coefficient due to majority carrier mobility is exactly matched with the drain current positive temperature coefficient due to changes in width of the thermally generated depletion region at the transistor gate channel junction. With a predetermined constant current supply to the capacitor 34, desired slope for the ramp voltage 22 is simply obtained by appropriate selection of the capacitance value of the capacitor 34. The temperature coefficient of capacitance for the capacitor 34 can be sufficiently low to have negligible effect upon the ramp voltage slope.

The ramp reset pulses 28 generated at the reset pulse terminal 44 occur near the beginning of each positive half cycle of the input signal 12 and are produced by means of a conventional one shot multivibrator 56 included in the pulse circuit 30 and energized through a power supply terminal 57. The multivibrator 56 in this instance preferably includes a pair of transistors 58 and 60 and other separate components, but a solid state one shot multivibrator block can be employed if its operating characteristics are appropriate and if it is otherwise adaptable for overall functioning in the frequency measuring circuit 10.

To provide sharpness in the successive ramp reset pulses 28 at the terminal 44, a pulse forming circuit 62 is connected between the pulse circuit input terminals 14 and 16 and input terminal 64 of the multivibrator 56. The pulse forming circuit 62 transforms the signal 12 into a waveform having nearly square positive pulses 66 generated between terminal 68 and the terminal 16.

For this purpose, the circuit 62 includes a solid state switch or transistor 70 having its collector connected through terminals 68 and collector current limiting resistor 72 to DC power supply terminal 74 and having its emitter terminal 76 and base terminal 78 connected in a loop including base current limiting resistor 80 and input terminals 14 and 16. The base-emitter loop is bridged by a path including a voltage sensitive device preferably in the form of a tunnel diode 82 for which there is provided a current limiting resistor 84.

At the beginning of each cycle of the signal 12, the transistor 70 is non-conducting and a high voltage is present at the collector terminal 68. When the signal voltage reaches a predetermined value as indicated by the reference character 86 (FIG. 2), the characteristic peak value of current is reached in the tunnel diode 82 so as to cause the tunnel diode 82 to switch to its high voltage state. The base emitter PN junction of the transistor 70 is then forward biased to switch the transistor 70 into its conductive state thereby causing the voltage at the collector terminal 68 to drop with rapid fall time to substantially zero value as indicated by the reference character 88.

The transistor 70 continues in its conductive state so long as the tunnel diode current exceeds the characteristic valley current value to hold the tunnel diode 82 in its high voltage state. When the signal voltage cycles to a lower predetermined value as indicated by the reference character 90, the tunnel diode 82 is returned to its low voltage state thereby turning off the transistor 70 and causing the voltage at the collector terminal 68 to rise to its former value as indicated by the reference character 92.

Each time the voltage at the collector terminal 68 falls as indicated by the reference character 88, coupling capacitor 94 applies a reverse voltage across the base-emitter PN junction of the multivibrator transistor 58 so as to switch the transistor 58 from its normally conducting state to a nonconducting state. A sharp positive pulse, previously referred to as the reset pulse 28, is thus generated at collector terminal 96 of the transistor 58 and at the pulse reset terminal 44.

The duration of the pulse 28 is controlled by the time constant of the multivibrator RC timing circuit including resistor 98 and capacitor 100. Preferably, the pulse duration is relatively short as compared to the time duration of the cycle of the signal voltage 12 in the interest of high frequency measuring accuracy. With a relatively short multivibrator pulse, for example a pulse having $\frac{1}{1000}$ of the time duration of a cycle of the signal 12 having a frequency of 400 cycles per second, variation in the length of the successive pulses 28 due to various causes can be as great as 100% or more with little effect on frequency measuring accuracy since the ramp voltage reset time period 46 is very small compared to the time interval being measured.

Although the exact point in the signal voltage 12 at which the multivibrator 56 is triggered is ordinarily unimportant, it is important for measurement accuracy that the trigger point be substantially identical for successive cycles of the voltage signal 12. If the trigger point of the multivibrator 56 drifts with temperature, some error is introduced only during the period of the trigger drift since the phase point of the input signal 12 at which the ramp voltage 22 is reset advances or retards from cycle to cycle. However, the rate at which the multivibrator trigger point drifts with temperature is normally slow enough to maintain good overall frequency measuring accuracy.

The reset pulses 28 are thus generated once each cycle of the input signal 12 and substantially at identical points in the input signal waveform. A highly accurate indication of the time duration of each signal voltage cycle is thus provided between successive reset pulses 28 for the purpose of fixing substantially equal amounts of time over which the ramp voltage 22 rises from cycle to cycle of operation.

It is also noted that the multivibrator transistor 60, which is normally nonconductive, becomes conductive each time a reset pulse 28 is generated at the collector terminal 96 of the multivibrator transistor 58 by reason of a forward bias applied across its base-emitter PN junction. Voltage at collector terminal 102 of the multivibrator transistor 60 then drops from a high value to a low or substantially zero value. At the termination of each reset pulse 28, the forward bias on the multivibrator transistor 60 is terminated and the transistor 60 returns to its normally nonconductive state in which the collector terminal 102 returns to its normal high voltage level. Changes in voltage at the collector terminal 102 are coupled across multivibrator output resistor 104 between multivibrator output terminal 106 and ground through a coupling capacitor 108 for purposes which will subsequently be considered more fully.

The reference voltage level 24 provided by the reference circuit 26 is set to a predetermined value so as to provide a comparison base for determining whether the ramp voltage 22 is generated for an excessive length of time and hence whether the frequency of the input signal 12 is below its desired value. For this purpose, the reference circuit 26 includes a voltage sensitive solid state block 110 for which the sensitivity to input voltage is stable with wide variation in operating temperature. The block 110 is preferably in the form of a commercially available reference amplifier having an input terminal 112 connected to the supply side of the ramp generator capacitor 34 and another input or "diode" terminal 114 connected through variable resistor 116 to ground terminal 122.

As schematically indicated, the reference amplifier 110 is integrally structured to include an NPN transistor 118 and a Zener diode 120 with the diode 120 connected in series with the base-emitter PN junction of the transistor 118 between the input terminals 112 and 114. Temperature stability of the amplifier input voltage sensitivity is based on the fact that the characteristic base-emitter switching voltage of the transistor 118 has a negative temperature coefficient while the Zener diode 120 has a positive temperature coefficient which is a function of the Zener breakdown voltage, that is, the Zener temperautre coefficient becomes more positive as the design value of the Zener breakdown voltage is increased above a minimum value (which is usually about 6 volts).

By proper design selection of the Zener breakdown voltage, the positive and negative temperature coefficient can be substantially cancelled in the series circuit between the reference amplifier terminals 112 and 114 so as to result at most in a very low and negligible net temperature coefficient for the amplifier reference voltage level. Further, by reason of the integrated structure, temperature differentials between the Zener diode 120 and the transistor 118 are minimized so that nearly identical operating temperatures are determinative of the respective temperature coefficients. Transient variations in input voltage sensitivity are thus reduced.

A fixed reference voltage level is thus provided between the reference amplifier input terminals 112 and 114 in the sense that a substantially fixed input voltage switches the transistor 118 from a nonconductive state to a conductive state. The variable resistor 116 is preferably connected as previously described to provide for manual variance of the reference amplifier voltage level to the reference voltage level 24.

When the ramp voltage 22 exceeds the reference voltage level 24, the reference amplifier 110 begins to conduct current from DC power supply terminal 50 through resistor 124 in the collector-emitter path to the variable resistor 116 and ground. Such conduction is initiated if the ramp voltage 22 reaches the reference voltage level 24 before the appearance of a reset pulse 28 at the reset pulse terminal 44 as indicated by the reference character 126 (FIG. 2). On the other hand, if the ramp voltage 22 fails to reach the reference voltage 24 prior to the occurrence of a reset pulse 28, as indicated by the reference character 128, the reference amplifier 110 remains in a nonconductive output state between the power supply terminal 50 or collector output terminal 130 and ground.

When the reference amplifier 110 becomes conductive, the voltage level at collector terminal 130 drops as indicated by reference character 132 (FIG. 2) with increasing reference amplifier current and is representative of the fact that the rise time of the ramp voltage is excessive and hence that the frequency of the input signal 12 is undervalued. When the ramp voltage generator 20 is reset by the next reset pulse 28, the reference amplifier 110 changes to the nonconductive state and the voltage level at the collector terminal 130 increases to its former value as indicated by the reference character 134.

To provide a continuous output indication of the periodic voltage signal produced at the reference amplifier collector terminal 130 during any underfrequency cycle of the input signal 12, the reference circuit 26 is preferably coupled with the logic circiut 32 by means of a bistable trigger circuit 136 which includes the reference circuit 26 as a part thereof. A frequency indicator logic pulse is thus developed by the trigger circuit 136 for use in the logic operation of the logic circuit 32.

The bistable trigger circuit 136 is similar to the well known Schmitt trigger circuit in that the reference amplifier transistor 118 and an output transistor 138 have respective emitter terminals 140 and 142 coupled together and commonly connected through an emitter resistor 116 while collector terminal 130 is coupled to transistor base terminal 144 through resistor 146. The transistor base terminal 144 in turn is connected to ground through resistor 148. Generally, only one of the transistors 118 or 138 is conducting and normally the transistor 138 conducts a collector-emitter current from DC power supply terminal 50 through collector resistor 150 to ground.

When the trigger circuit input from the ramp voltage generator 20 rises above the reference voltage level 24 (i.e., the upper characteristic trip point) to cause the reference amplifier transistor 118 to conduct, regenerative action rapidly occurs to impose a reverse bias on the base-emitter junction of the transistor 138 and place it in a nonconductive state. The voltage level at the transistor collector terminal 152 then rises sharply while the voltage level at the collector terminal 130 drops sharply as indicated by the reference character 133 to level 135. The dotted line 137 is included only to indicate the manner in which the voltage level of the collector terminal 130 would drop if it were operated as a linear amplifier (i.e., not in the bistable trigger circuit 136). On the other hand, when the trigger circuit input from the ramp voltage generator falls sufficiently below the reference voltage level 24 (i.e., to the lower characteristic trip point) opposite regeneration occurs and the reference amplifier transistor 118 becomes nonconductive (134) while the transistor 138 becomes conductive. The voltage level at the collector terminal 152 then rapidly drops to approximately the potential of the emitter terminal 142 (i.e., approximately the reference level 24). To provide a logic pulse for further logic circuit use, the collector terminal 152 is connected through a coupling capacitor 154 and a resistor 156 to ground.

The primary difference between the trigger circuit 136 and the common Schmitt trigger circuit is that the reference amplifier 110 is employed instead of an ordinary transistor and accordingly the reference amplifier Zener diode 120 is in this case connected in the trigger circuit emitter path. An advantage is gained in that the collector-emitter current of the transistor 138 forms a bias current through the Zener diode 120 and the variable resistor 116 while the reference amplifier transistor 118 is nonconductive.

By suitably selecting the collector resistor 150, the bias current through the Zener diode 120 is set to a value which causes the reference voltage to remain essentially constant with changes in operating temperature. Namely, the Zener bias current is sufficient to operate the Zener diode 120 at a current voltage point where increasing temperature produces increasing diode voltage drop in substantially matching relation with the decreasing base-emitter switching voltage resulting from the same increasing temperature. The temperature stable reference voltage level 24 accordingly is the sum of the base-emitter voltage of the transistor 118, the voltage drop across the Zener diode 120 and the voltage drop across the variable resistor 116. It is further noted that variance of the resistor 116 to achieve variance in the reference voltage level 24 preferably has negligible effect on the level of the Zener bias current, and this result is achieved by use of a low value of resistance for the resistor 116 as compared to that for the collector resistor 150 (for example, a resistance ratio of .02 is suitable).

The logic circuit 32 adapts the frequency measuring circuit 10 for combination with other circuitry in larger digital systems designed for control or other purposes. The logic pulse information across the trigger circuit output resistor 156 is transmitted through a diode 158 to an input set terminal 160 of a flip-flop circuit 162 preferably in the form of a commercially available solid state flip-flop block having DC power input terminals 164 and 166. The diode 158 feeds only positive pulses 161 to the flip-flop set terminal 160, that is only those pulses occurring across the trigger circuit output resistor 156 when the ramp voltage 22 first switches the reference amplifier 110 to a conductive state. Pulses occurring across the resistor 156 when the ramp voltage 22 is reset to switch the reference amplifier 110 to a nonconductive state are thus blocked from the flip-flop set terminal 160.

A reset terminal 168 of the flip-flop block 162 is connected to the multivibrator output terminal 106 so as to receive pulses generated across the multivibrator output resistor 104 each time the multivibrator transistor 60 is reswitched to a nonconductive state at the termination of the ramp reset pulses 28 produced by the multivibrator transistor 58. Pulses produced across the resistor 104 at the beginning of the ramp reset pulses 28 when the transistor 60 is switched from a nonconductive state to a conductive state are blocked from the flip-flop reset terminal 168 by diode 170.

Since a flip-flop reset pulse is generated once each cycle as indicated by the reference character 172, the flip-flop block 162 operates as a temporary memory, that is flip-flop output terminal 174 operates at a high voltage state as indicated by the reference character 176 only during the time period between a set pulse 161 and a reset pulse 172 applied to the flip-flop terminals 160 and 168. The overall temporary memory logic behavior of the flip-flop block 162 is shown in FIG. 3 where Q represents the output at the flip-flop terminal 174 while the logical complement Q' is provided at flip-flop output terminal 177.

To provide a continuous logic output, a permanent memory device or shift register 178 is connected to the flip-flop block 162 and it is triggered by the ramp generator reset voltage pulses 28 through terminal 44 and conductor 180 each cycle of the input signal 12. Preferably, the shift register 178 is a commercially available solid state device having DC power input terminals 182 and 184 and having logic input set and reset terminals 186 and 188 and logically complementary output terminals 190 and 192. A high voltage bit of information at the terminal 186 or 188 as indicated by the reference character 176 or 194 is transferred to the logic output terminal 190 or 192 when the ramp reset voltage pulse 28 is applied to trigger terminal 196. Preferably, such transference of information occurs at the end of the reset pulse 28.

The shift register output terminals 190 and 192 are logically complementary on a continuous basis since one or the other is always at a high voltage state as indicated by the reference character 198 or 200. If the flip-flop block 162 has been set at the terminal 160 prior to ramp voltage reset in any given signal cycle, this temporary information is transferred to the shift register input set terminal 186 from the flip-flop output terminal 174. The information is in turn transferred to the shift register output terminal 190 when the ramp voltage reset pulse 28 is next generated at the trigger terminal 196. The shift register terminal 190 accordingly acquires a high voltage state as indicated by the reference character 198 to indicate an underfrequency condition for the input signal 12. The terminal 190 remains at the high voltage state so long as the underfrequency condition continues.

Once the underfrequency condition is corrected such that the flip-flop set terminal 160 is not pulsed prior to ramp voltage reset, voltage information at the flip-flop output terminal 177 is transferred to the shift register output terminal 192 by the next pulse 28 at the trigger terminal 196. The terminal 192 thus acquires a high voltage state as indicated by the reference character 200 while the terminal 190 acquires a zero voltage state to indicate that the input signal 12 has a frequency at least as high as the desired frequency level. The continuous nature of the complementary output provided by the shift register terminals 190 and 192 is what characterizes the shift register as a permanent memory. The overall logic behavior of the shift register 178 is shown in FIG. 3.

Although the frequency measuring circuit 10 is in this instance limited to underfrequency detection, it can be readily modified to measure overfrequency conditions or both underfrequency and overfrequency conditions. For example, a pair of ramp generators 20 can be operated in "parallel" with respective reference voltage and logic circuits associated therewith. Two measuring channels are thus provided and one of the channels can be adjusted to indicate frequencies under a given high frequency (say 420 cycles per second) and the other can be adjusted to indicate frequencies under a given low frequency (say 380 cycles per second). If neither channel indicates, the frequency is higher than the range between the high and low frequencies and if both channels indicate the frequency is lower than the frequency range. If only the one channel indicates, the frequency is within the preset frequency range.

In operation, the circuit performs with accuracy less than plus or minus ½% over a relatively wide range of operating temperatures. The accuracy is due in part to the comparatively high precision with which ramp reset pulses are generated by the pulse circuit 30 at substantially identical time points in successive input signal cycles. It is also due to the temperature stability which characterizes the ramp voltage generator by the ramp voltage generator 20 and the reference voltage level provided by the reference circuit 26. The frequency indicating logical output developed by the logic circuit 32 provides for realizing the frequency measuring accuracy in a wide variety of digital systems. Other advantages include the rapid one cycle response time achieved and the packaging convenience and reliability achieved through employment of solid state components.

The foregoing description has been set forth only to illustrate the principles of the invention. Accordingly, it is desired that the invention be not limited by the embodiment described, but, rather, that it be accorded an interpretation consistent with the scope and spirit of its broad principles.

I claim:

1. A frequency measuring circuit comprising a temperature stable ramp voltage generator, means for resetting said ramp voltage generator at successive substantially identical cycle points of an input cyclical signal, voltage comparison circuit means including means for establishing a reference voltage and solid state means for comparing the ramp voltage to the reference voltage, logic circuit means connected to respond to the last mentioned circuit means to provide an output indication when said ramp voltage exceeds said reference voltage level, said logic circuit means including a solid state flip-flop block having a set terminal connected to respond to said voltage comparison circuit means and a reset terminal connected to respond to said reset means to provide a temporary output indication of excessive ramp voltage, and a solid state shift register connected to respond to said flip-flop block and said reset means to provide a continuous output indicaton of the frequency level of said input signal.

2. A frequency measuring circuit comprising a temperature stable ramp voltage generator, means for resetting said ramp voltage generator at successive substantially identical cycle point of a input cyclical signal, voltage comparison circuit means including means for establishing a reference voltage and a solid state reference amplifier for comparing the ramp voltage to the reference voltage, logic circuit meens connected to respond to the last mentionad circuit means to provide output indication when said ramp voltage exceeds said reference voltage, said logic circuit means including a solid state flip-flop block having a set terminal connected to respond to the output of said reference amplifier and a reset terminal connected to said reset means to provide a temporary output indication when the ramp voltage exceeds the reference voltage, and a solid state shift register connected to respond to said flip-flop block and said reset means to provide a continuous output indication of the frequency level of said input signal.

3. A frequency measuring circuit comprising a temperature stable ramp voltage generator, means for resetting said ramp voltage generator at successive substantially identical cycle points of an input cyclical signal, voltage comparison circuit means including means for establishing a reference voltage and a solid state reference amplifier for comparing the ramp voltage to the reference voltage, logic circuit means connected to respond to the last mentioned circuit means to provide an output indication when said ramp voltage exceeds said reference voltage, said reference amplifier connected in a bistable trigger circuit having an output solid state device adapted to provide a logic pulse each time said ramp voltage exceeds said reference voltage, said logic circuit means including a solid state flip-flop block having a set terminal connected to respond to the logic pulse output of said trigger circuit and a reset terminal connected to said reset means to provide a temporary output indication when the ramp voltage exceeds the reference voltage, and a solid state shift register connected to respond to said flip-flop block and said reset means to provide a continuous output indication of the frequency level of said input signal.

4. A frequency measuring circuit comprising a temperature stable ramp voltage generator, a pulse forming circuit for generating a waveform having the frequency of an input cyclical signal, circuit means including a one shot multivibrator actuated by said pulse forming circuit and connected to reset said ramp voltage generator at successive susbtantially identical cycle points, voltage comparison circuit means including means for establishing a reference voltage and a solid state reference amplifier for comparing the ramp voltage to the reference voltage, said reference amplifier connected in a bistable trigger circuit having an output solid state device adapted to provide a logic pulse each time said ramp voltage exceeds said reference voltage, logic circuit means connected to respond to said trigger circuit to provide an output indication when said ramp voltage exceeds said reference voltage, said logic circuit means including a solid state flip-flop block having a set terminal connected to respond to the logic pulse output of said trigger circuit and a reset terminal connected to said multivibrator to provide a temporary output indication when the ramp voltage exceeds the reference voltage, and a solid state shift register connected to respond to said flip-flop block and said multivibrator to provide a continuous output indication of the frequency level of said input signal.

5. A frequency measuring circuit comprising a temperature stable ramp voltage generator having an output capacitor, a pulse forming circuit for generating a waveform having the frequency of an input cyclical signal, a reset transistor operative to discharge said capacitor, a one shot multivibrator actuated by said pulse forming circuit and connected to switch said transistor and reset said ramp voltage generator at successive substantially identical cycle points, voltage comparison circuit means including means for establishing a reference voltage and a solid state reference amplifier for comparing the ramp voltage to the reference voltage, said reference amplifier connected in a bistable trigger circuit having an output solid state device adapted to provide a logic pulse each time said ramp voltage exceeds said reference voltage, logic circuit means including a solid state flip-flop block having a set terminal connected to respond to the logic pulse output of said trigger circuit and a reset terminal connected to said multivibrator to provide a temporary output indication when the ramp voltage exceeds the reference voltage, and a solid state shift register connected to respond to said flip-flop block and said multivibrator to provide a continuous output indication of the frequency level of said input signal.

6. A frequency measuring circuit for indicating the frequency level of a cyclical input signal, said circuit comprising a ramp voltage generator, pulse forming means actuated by the input signal to produce pulses at substantially identical points in each cycle of the input signal, said pulses being of short duration relative to the duration of a cycle of the input signal, means for applying said pulses to the ramp voltage generator to reset the ramp voltage generator upon the occurrence of each pulse, and voltage comparison means including means for establishing a fixed reference voltage and means for providing an output signal when the ramp voltage exceeds the reference voltage, and logic circuit means for converting the output signals from the voltage comparison means to a continuous digital signal indicating the frequency level of the input signal.

References Cited

UNITED STATES PATENTS

| | | | |
|---|---|---|---|
| 2,661,420 | 12/1953 | Woodruff | 328—185 X |
| 2,878,448 | 3/1959 | Maxey | 324—78 X |
| 3,026,485 | 3/1962 | Suran | 307—88.5 |
| 3,109,943 | 11/1963 | Merlew | 307—88.5 |
| 3,114,114 | 12/1963 | Atherton et al. | 307—88.5 |
| 3,149,239 | 9/1964 | Weygang | 307—88.5 |
| 3,173,107 | 3/1965 | Scharf et al. | 307—88.5 |
| 3,207,929 | 9/1965 | Kruy | 307—88.5 |
| 3,214,608 | 10/1965 | Mollinga | 307—88.5 |
| 3,231,764 | 1/1966 | Thornberg et al. | 307—88.5 |

FOREIGN PATENTS 718,128    11/1954    England.

RUDOLPH V. ROLINEC, *Primary Examiner.*

P. F. WILLE, *Assistant Examiner.*